United States Patent
Cseh et al.

[11] 3,872,078
[45] Mar. 18, 1975

[54] DISAZO PIGMENTS, PROCESSES FOR THEIR MANUFACTURE AND USE

[75] Inventors: Georg Cseh, Basel; Willy Müller, Riehen, both of Switzerland

[73] Assignee: Ciba-Geigy Corporation, Ardsley, N.Y.

[22] Filed: Nov. 7, 1972

[21] Appl. No.: 304,426

[30] Foreign Application Priority Data
Nov. 11, 1971 Switzerland.................... 16374/71

[52] U.S. Cl. ............ 260/176, 106/208 Q, 260/37 P
[51] Int. Cl...................................... C09b 33/16
[58] Field of Search ..................... 260/176

[56] References Cited
UNITED STATES PATENTS

| | | | |
|---|---|---|---|
| 3,218,311 | 11/1965 | Forter et al..................... | 260/176 X |
| 3,413,279 | 11/1968 | Mueller.............................. | 260/176 |
| 3,513,154 | 5/1970 | Towle et al....................... | 260/176 |

*Primary Examiner*—Floyd D. Higel
*Assistant Examiner*—C. F. Warren
*Attorney, Agent, or Firm*—Vincent J. Cavalieri

[57] ABSTRACT

New disazo pigments being qualified for pigmenting high molecular organic material and having the formula

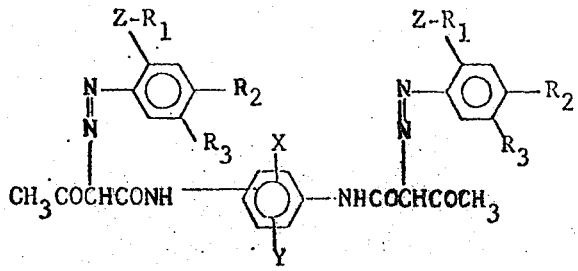

wherein $R_1$ denotes an alkyl, alkoxyalkyl or cycloalkyl group containing 1 – 6 carbon atoms or an aralkyl, aryloxy or aryl group, $R_2$ denotes the group $Z-R_1$ or a hydrogen or halogen atom or a nitro, trifluoromethyl or nitrile group or an alkyl group containing 1 – 4 carbon atoms, $R_3$ denotes a hydrogen or halogen atom or a trifluoromethyl group, Z denotes a sulphur or oxygen atom, X denotes a hydrogen or halogen atom, an alkyl or alkoxy group containing 1 – 4 carbon atoms or a nitro, nitrile, trifluoromethyl, carboxylic acid amide or carboxylic acid ester group and Y denotes a hydrogen or halogen atom, an alkyl or alkoxy group containing 1 – 4 carbon atoms or a nitro, nitrile, trifluoromethyl, carboxylic acid ester or carboxylic acid amide group. The pigments are insoluble and show excellent fastness to light and migration and can be used for pigmenting high molecular weight organic materials such as cellulose esters, polyamides and polyesters.

7 Claims, No Drawings

DISAZO PIGMENTS, PROCESSES FOR THEIR MANUFACTURE AND USE

It has been found that new valuable disazo pigments of the formula

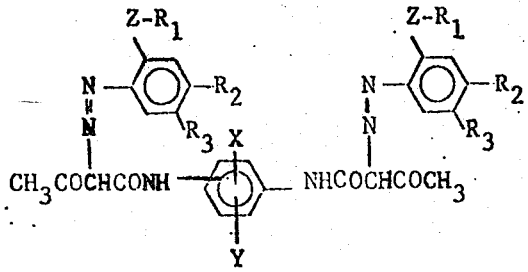

is coupled with a bis-acetoacetyl-phenylenediamine of the formula

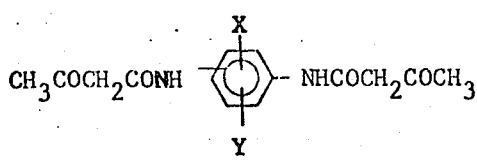

in the molar ratio of 2 : 1.

Particular interest attaches to disazo pigments of the formulae

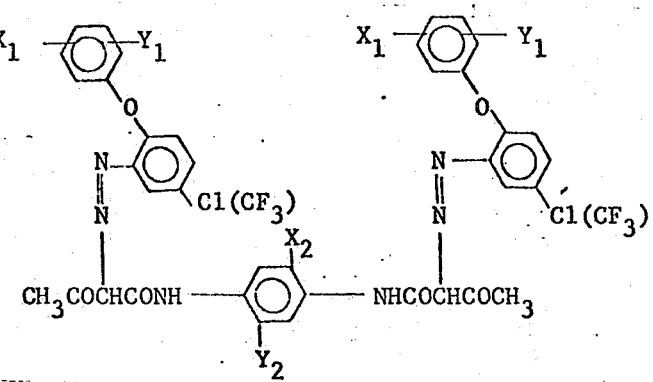

or

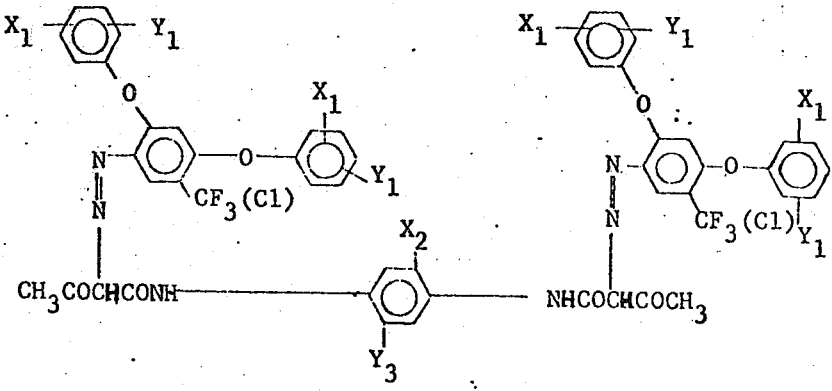

wherein $R_1$ denotes an alkyl, alkoxyalkyl or cycloalkyl group containing 1 – 6 carbon atoms, or an aralkyl, aryloxy or aryl group, $R_2$ denotes the group $Z-R_1$ or a hydrogen or halogen atom or a nitro, trifluoromethyl, nitrile or alkyl group containing 1 – 4 carbon atoms, $R_3$ denotes a hydrogen or halogen atom or a trifluoromethyl group, Z denotes a sulphur or oxygen atom, X denotes a hydrogen or halogen atom, an alkyl or alkoxy group containing 1 to 4 carbon atoms, or a nitro, nitrile, trifluoromethyl, carboxylic acid amide or carboxylic acid ester group and Y denotes a hydrogen or halogen atom, an alkyl group containing 1 to 4 carbon atoms or a nitro, nitrile, trifluoromethyl, carboxylic acid ester or carboxylic acid amide group, are obtained if a diazo or diazoamino compound of an amine of the formula wherein $X_1$, $Y_1$, $X_2$ and $Y_3$ denote hydrogen or halogen atoms or alkyl, alkoxy or carbalkoxy groups containing 1 – 6 carbon atoms and $Y_2$ denotes a hydrogen or halogen atom or an alkyl group containing 1 – 4 carbon atoms.

Diazo compounds used are in particular those of the formulae

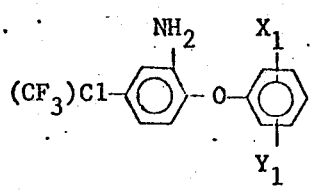

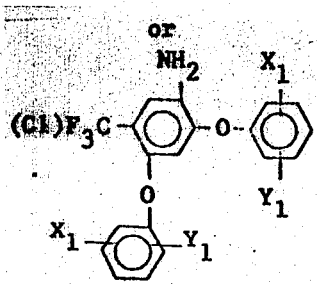

wherein $X_1$ and $Y_1$ have the indicated meaning.

The diazo components are obtained by reduction of substituted nitrodiphenyl ethers which have been manufactured from nitrochlorobenzenes and phenol derivatives under alkaline conditions in dimethylsulphoxide or dimethylformamide.

The following known diazo components may be mentioned as examples: 2-amino-diphenyl-ether, 2-amino-2'-chloro-diphenyl-ether, 2-amino-4'-chloro-diphenyl-ether, 2-amino-4'-bromo-diphenyl-ether, 2-amino-2'-methoxy-diphenyl-ether, 2-amino-3'-methyl-diphenyl-ether, 2-amino-4'-phenyl-diphenyl-ether, 2-amino-2'-chloro-6'-methyl-diphenyl-ether, 2-amino-4-chloro-diphenyl-ether, 2-amino-4,2'-dichloro-diphenyl-ether, 2-amino-4,4'-dichloro-di-phenyl-ether, 2-amino-4,4'-dichloro-thio-diphenyl-ether, 2-amino-4-chloro-4'-methyl-diphenyl-ether, 2-amino-4-chloro-4'-ethoxycarbonyl-diphenyl-ether, 2-amino-4,4'-dichloro-3'-methyl-diphenyl-ether, 2-amino-4-chloro-3',5'-dimethyl-di-phenyl-ether, 2-amino-4,2',4',6'-tetrachloro-diphenyl-ether, 2-amino-4-trifluoromethyl-diphenyl-ether, 2-amino-4-trifluoro-methyl-4'-chloro-diphenyl-ether, 2-amino-4-trifluoromethyl-4'-chloro-thio-diphenyl-ether, 2-amino-4-trifluoromethyl-4'-methoxy-diphenyl-ether, 2-amino-4-trifluoro-methyl-2'-methyl-4'-chloro-diphenyl-ether, 2-amino-4-trifluoro-methyl-2',6'-dimethyl-diphenyl-ether, 2-amino-4-trifluoromethyl-2',4',6'-trichloro-diphenyl-ether, 2-amino-4-trifluoromethyl-2',4',5'-trichloro-diphenyl-ether, 2-amino-4-methyl-2'-chloro-diphenyl-ether, 2-amino-4-methyl-4'-chloro-diphenyl-ether, 2-amino-4-methoxy-2'-chloro-diphenyl-ether, 2-amino-4-methoxy-4'-chloro-diphenyl-ether, 2-amino-4-methoxy-4'-methyl-diphenyl-ether, 2-amino-4-methylmercapto-4'-chloro-diphenyl-ether, 2-amino-6,4'-dichloro-diphenyl-ether, 2-amino-4-methyl-4'-methoxy-diphenyl-ether, 2-amino-4'-nitro-diphenyl-ether, 2-amino-4,5-dichloro-di-phenyl-ether, 2-amino-4,5,2'-trichloro-diphenyl-ether, 2-amino-4,5,4'-trichloro-diphenyl-ether, 2-amino-4,5-dichloro-3',5'-dimethyl-diphenyl-ether, 2-amino-4,5,2',4',6'-pentachloro-di-phenyl-ether, 2-amino-4,2'-dichloro-5-nitro-diphenyl-ether, 2-amino-phenol-[4-chloro-benzyl]-ether, 2-amino-4-chloro-phenol-[benzyl]-ether, 2-amino-4-trifluoromethyl-[2-chloro-benzyl]-ether, 2-amino-4,5-dichloro-[4-chloro-benzyl]-ether, 2-amino-2',4',6'-trichloro-diphenyl-ether, 2-amino-4,5-dichloro-4'-cyclohexyl-diphenyl-ether, 2-amino-4-chloro-1-[α-naphthoxy)-benzene, 2-amino-4-trifluoromethyl-1[β-naphthoxy]-benzene, 2-amino-4,5-dichloro-1-[5',6',7',8'-tetrahydro-2'-naphthoxy]-benzene, 2,4-dicyclohexyloxy-5-trifluoromethyl-aniline, 2,4-di-phenoxy-5-trifluoromethylaniline, 2,4-di-(o-methylphenoxy)-5-trifluoromethylaniline, 2,4-di-(p-methyl-phenoxy)-5-trifluoro-methylaniline, 2,4-di-(p-methoxyphenoxy)-5-trifluoromethylaniline, 2,4-di-(o-chlorophenoxy)-5-trifluoro-methylaniline, 2,4-di-(p-chlorophenoxy)-5-trifluoromethylaniline, 2,4-di-(p-bromo-phenoxy)-5-trifluoromethylaniline, 2,4-di-(2',4'-dichlorophenoxy)-5-trifluoromethylaniline, 2,4-di-(α-naphthoxy)-5-trifluoromethylaniline, 2,4-di-(β-naphthoxy)-5-trifluoromethyl-aniline, 2,4-di(p-diphenyloxy)-5-trifluoromethylaniline, 2,4-di-(2',4',5'-trichlorophenoxy)-5trifluoromethylaniline, 2,4-di-(2',3',4',5',6'-pentachlorophenoxy)-5-trifluoromethylaniline, 2,4-di-(p.tert.-amylphenoxy)-5-trifluoromethylaniline, 2,4-diphenylmercapto-5-trifluoromethylaniline, 2,4-diphenoxy-5-chloroaniline, 2,4-di-(o-methylphenoxy)-5-chloroaniline, 2,4-di-(p-methylphenoxy)-5-chloroaniline, 2,4-di-(p-methoxyphenoxy)-5-chloroaniline, 2,4-di-(o-chlorophenoxy)-5-chloroaniline, 2,4-di-(p-chlorophenoxy)-5-chloroaniline, 2,4-di-(p-bromophenoxy)-5-chloroaniline, 2,4-di-(2',4'-dichlorophenoxy)-5-chloro-aniline, 2,4-di-(α-naphthoxy)-5-chloroaniline, 2,4-di-(β-naphthoxy)-5-chloroaniline, 2,4-di-(p-diphenyloxy)-5-chloro-aniline, 2,4-di-(2',4',5'-trichlorophenoxy)-5-chloroaniline, 2,-4-di-(2',3',4',5',6'-pentachlorophenoxy)-5-chloroaniline, 2,4-di-(p.tert.-amylphenoxy)-5-chloroaniline and 2,4-diphenyl-mercapto-5-chloroaniline.

The coupling components preferably correspond to the formula $$CH_3COCH_2CONH-\underset{Y}{\overset{X}{\bigcirc}}-NHCOCH_2COCH_3.$$

The coupling components are obtained in a simple manner by the action of diketene or ethyl acetoacetate on the corresponding known phenylenediamines such as, for example: 1,4-phenylenediamine, 2-chloro-1,4-phenylenediamine, 2-bromo-1,4-phenylenediamine, 2-trifluoromethyl-1,4-phenylenediamine, 2-cyano-1,4-phenylenediamine, 2-methyl-1,4-phenylenediamine, 2-methoxy-1,4-phenylenediamine, 2-ethoxy-1,4-phenylenediamine, 2-propoxy-1,4-phenylenediamine, 2-iso-propoxy-1,4-phenylenediamine, 2-butoxy-1,4-phenylenediamine, 2-phenoxy-1,4-phenylenediamine, 2-nitro-1,4-phenylenediamine, 2-carboxylic acid amide-1,4-phenylenediamine, 2-carboxylic acid methyl ester-1,4-phenylenediamine, 2-carboxylic acid ethyl ester-1,4-phenylenediamine, 2,5-dicarboxylic acid ethyl ester-1,4-phenylenediamine, 2,3-dichloro-1,4-phenylenediamine, 2,5-dichloro-1,4-phenylenediamine, 2,6-dichloro-1,4-phenylenediamine, 2,6-bis-trifluoromethyl-1,4-phenylenediamine, 2,6-dibromo-1,4-phenylenediamine, 2-chloro-5-methyl-1,4-phenylenediamine, 2-chloro-5-methoxy-1,4-phenylenediamine, 2-chloro-5-ethoxy-1,4-phenylenediamine, 2,5-dimethyl-1,4-phenylenediamine, 2-methyl-5-methoxy-1,4-phenylenediamine, 2-methyl-5-ethoxy-1,4-phenylenediamine, 2-methyl-5-propoxy-1,4-phenylenediamine, 2-methyl-5-isopropoxy-1,4-phenylenediamine, 2-methyl-5-butoxy-1,4-phenylenediamine, 1,3-phenylenediamine, 4-chloro-1,3-phenylenediamine, 4-bromo-1,3-phenylenediamine, 2-methyl-1,3-phenylenediamine, 4-methyl-1,3-phenylenediamine, 4-methoxy-1,3-phenylenediamine, 2,4-dichloro-1,3-phenylenediamine, 2,5-di-chloro-1,3- phenylenediamine, 4,6-dichloro-1,3-phenylenediamine, 4,6-dimethyl-1,3-phenylenediamine and 2,6-dimethyl-1,3-phenylenediamine.

The coupling is preferably carried out in a weakly acid medium, appropriately in the presence of customary agents which promote coupling. As such there may in particular be mentioned dispersing agents, for example aralkylsulphonates, such as dodecylbenzenesulphonate, or 1,1'-dinaphthylmethane-2,2'-disulphonic acid or polycondensation products of alkylene oxides. The dispersion of the coupling component can also advantageously contain protective colloids, for example methylcellulose or minor amounts of inert organic solvents which are sparingly soluble or insoluble in water, for example optionally halogenated or nitrated aromatic hydrocarbons, such as benzene, toluene, xylene, chlorobenzene, dichlorobenzene or nitrobenzene, as well as aliphatic halogenated hydrocarbons, such as, for example,, carbon tetrachloride or trichloroethylene, and also water-miscible organic solvents, such as acetone, methyl ethyl ketone, methanol, ethanol or isopropanol.

The coupling can also advantageously be carried out by continuously combining an acid solution of the diazonium salt with an alkaline solution of the coupling component in a mixing nozzle, whereupon immediate coupling of the components takes place. It is necessary to take care that the diazo component and coupling component are present in equimolecular amounts in the mixing nozzle and it proves advantageous to use a slight excess of the diazo component. This is most simply achieved by checking the pH value of the liquid in the mixing nozzle. It is also necessary to ensure vigorous turbulent intermixing of the two solutions in the mixing nozzle. The resulting dyestuff dispersion is continuously withdrawn from the mixing nozzle and the dyestuff is isolated by filtration.

The coupling can also be carried out by heating a diazoamino compound of the amine to be used as diazo component with the diacetoacetylarylenediamine in an organic solvent, optionally in the presence of an aqueous-organic solvent, preferably in the presence of an acid.

The aryldiazoamino compounds to be used in accordance with the process are obtained according to known processes by coupling with aryldiazonium salt with a primary or, preferably, with a secondary amine. The most diverse amines are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, aliphatic amines such as cyclohexylamine, N-methylcyclohexylamine and dicyclohexylamine, aromatic amines such as 4-amino-benzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalenesulphonic acid, 1-aminonaphthalene-2,4-disulphonic acid, heterocyclic amines such as piperidine, morpholine, pyrrolidine and dihydroindole, and finally also sodium cyanamide or dicyandiamide.

As a rule, the diazoamino compounds obtained are sparingly soluble in cold water and can be isolated from the reaction medium in a crystalline form, if necessary after salting out. In many cases the moist press cakes can be used for the further reaction. In some cases it may prove advisable to dehydrate the diazoamides by vacuum drying prior to the reaction or to remove the water by azeotropic distillation after suspending the moist press cake in a solvent.

The coupling of the diazoamino compound with the bis-acetoacetyl-phenylenediamine is carried out in an organic solvent, for example chlorobenzene, o-dichlorobenzene, nitrobenzene, pyridine, ethylene glycol, ethylene glycol monomethyl ether or monoethyl ether, dimethylformamide, N-methylpyrrolidone, formic acid or acetic acid. When using solvents which are miscible with water it is not necessary to use the diazoamino compound in the anhydrous form. For example, the water-moist filter cakes can be used. The splitting of the diazoamino compound which precedes the coupling takes place in an acid medium. If neutral solvents are used, the addition of an acid, for example hydrogen chloride, sulphuric acid, formic acid, acetic acid, chloroacetic acid or propionic acid, is necessary.

The coupling is appropriately effected warm, preferably at temperatures of between 80° and 180°C, and in general takes place very rapidly and completely.

By virtue of their insolubility, the pigments obtained can be isolated from the reaction mixtures by filtration. It proves advantageous to post-treat the resulting pigments with an organic solvent which preferably boils above 100°C. Solvents which prove particularly suitable are benzenes substituted by halogen atoms or alkyl or nitro groups, such as xylenes, chlorobenzene, o-dichlorobenzene or nitrobenzene and pyridine bases such as pyridine, picoline or quinoline, and also ketones, such as cyclohexanone, ethers, such as ethylene glycol monomethyl ether or monoethyl ether, amides, such as dimethylformamide, or N-methyl-pyrrolidone, and sulphoxone.

The post-treatment preferably takes place by heating the pigment in the solvent to 100° – 150°C, whereupon, in many cases, a coarsening of the particles takes place, which has a favourable effect on the fastness to light and to migration of the pigments obtained.

Finally, the coupling can also be effected by suspending the amine to be diazotised together with the coupling component, in the molar ratio of 2:1, in an organic solvent and treating the mixture with a diazotising agent, especially an ester of nitrous acid, such as methyl nitrite, ethyl nitrite, butyl nitrite, amyl nitrite or octyl nitrite.

The new dyestuffs are valuable pigments which in a finely divided form can be used for pigmenting high molecular organic material, for example cellulose ethers and cellulose esters, such as ethylcellulose, cellulose acetate, cellulose butyrate, polyamides or polyurethanes or polyesters, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures.

At the same time it is immaterial whether the high molecular compounds mentioned are in the form of plastic masses, melts or spinning solutions, lacquers, paints or printing inks. Depending on the end use, it is advantageous to use the new pigments as toners or in the form of preparations.

Alongside the pure pigment the preparations can also contain, for example, natural resins, for example abietic acid or its esters, ethylcellulose, cellulose acetobutyrate, alkaline earth salts of higher fatty acids, fatty amines, for example stearylamine or rosin amine, vinyl chloride-vinyl acetate copolymers, polyacrylonitrile or polyterpene resins or water-soluble dyestuffs, for example dyestuff-sulphonic acids or their alkaline earth metal salts.

In the examples which follow, the parts denote parts by weight unless otherwise stated, and the percentages denote percentages by weight.

EXAMPLE 1

20.3 parts of 2-amino-4,4'-dichloro-diphenyl-ether in 300 parts by volume of glacial acetic acid are stirred with 25 parts by volume of concentrated hydrochloric acid, whereupon the hydrochloride of the base forms. The mixture is then cooled to −5°C by adding 300 parts of ice and is diazotised by adding 24 parts by volume of 4 N sodium nitrite. The yellow diazo solution is stirred at 0°–5°C until only traces of nitrous acid are still detectable. The diazo solution is then clarified by filtration, with the addition of a little decolourising charcoal. The filtrate is brought to pH 4 by adding 48 parts of anhydrous sodium acetate.

At the same time, 13.0 parts of 2-methyl-5-chloro-1,4-bis-acetoacetylaminobenzene and 12 parts by volume of 40 percent strength sodium hydroxide solution are dissolved in 800 parts of water and 5 parts of n-butylsulphoricinoleate are added. This solution is clarified by filtration, using 0.5 part of decolourising charcoal, and is then added dropwise over the course of 1–1½ hours to the diazo solution, whilst stirring well. In the course thereof, the temperature of the reaction mixture rises to 15°–20°C. After completion of the dropwise addition, no further diazo compound is detectable in the mixture. The mixture is stirred for one hour at room temperature, then warmed to 80°–85°C over the course of 1 hour and filtered hot, and the product is washed with hot water until free of salt. After drying at 95°–100°C in vacuo, 28.0 parts of a yellow dyestuff of the formula

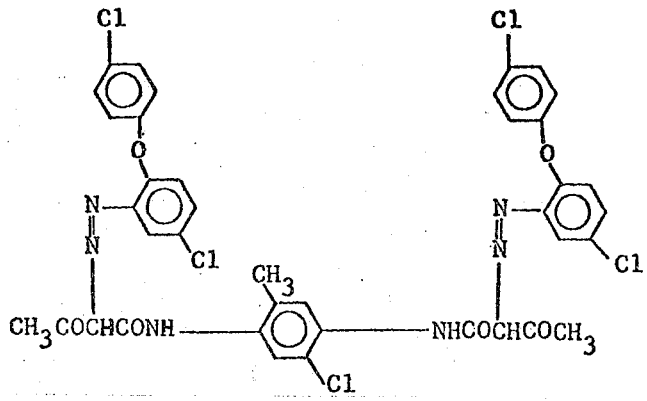

are obtained.

28 parts of the pigment thus obtained are stirred in 600 parts by volume of nitrobenzene for 8 hours at 145°–150°C. Hereupon the dyestuff assumes a uniform crystalline form. Fine yellow particles of length 10 μ are detectable under the microscope. The mixture is filtered at 140°C, the product is washed with boiling cellosolve until the filtrate issues colourless, the cellosolve is then displaced by dimethylformamide and finally the product is again washed with ethanol. After drying, 22 parts of a luminous yellow pigment dyestuff are obtained. It dyes plastics, such as PVC, in greenish-tinged yellow shades of excellent fastness to migration. The treatment in the organic solvent can also be carried out directly with the moist filter cake, without prior drying. Thus, the moist press cake can be stirred with picoline at 100°–120°C, filtered off and washed with methanol and subsequently with dilute hydrochloric acid, or the moist press cake is stirred in chlorobenzene, o-dichlorobenzene or nitrobenzene, freed of water by azeotropic distillation and then worked up as described above. The dyestuff dyes polyvinyl chloride in yellow shades of excellent fastness to light and to migration.

The table which follows describes further dyestuffs which are obtained by coupling the diazotised bases of column I with the bis-acetoacetic acid arylides of the diamines of column II. Column III indicates the colour shade of a PVC film coloured with 0.2 percent of these pigments.

Table

| Example No. | Diazo base | Bis-acetoacetyl compound of the diamine | 0.2% colouration in PVC |
|---|---|---|---|
| 2 | 2-Amino-4-chloro-diphenyl-ether | 1,4-Phenylenediamine | Yellow |
| 3 | " | 2-Chloro-1,4-phenylenediamine | " |
| 4 | " | 2-Bromo-1,4-phenylenediamine | " |
| 5 | " | 2-Trifluoromethyl-1,4-phenylenediamine | " |
| 6 | " | 2-Cyano-1,4-phenylenediamine | " |
| 7 | " | 2-Methyl-1,4-phenylenediamine | " |
| 8 | " | 2-Methoxy-1,4-phenylenediamine | Greenish-tinged yellow |
| 9 | " | 2-Nitro-1,4-phenylenediamine | Yellow |
| 10 | " | 2-Carboxylic acid amide-1,4-phenylenediamine | " |
| 11 | " | 2-Carboxylic acid methyl ester-1,4-phenylenediamine | " |

Table—Continued

| Example No. | Diazo base | Bis-acetoacetyl compound of the diamine | 0.2% colouration in PVC |
|---|---|---|---|
| 12 | " | 2,5-Dichloro-1,4-phenylenediamine | " |
| 13 | " | 2,6-Dichloro-1,4-phenylenediamine | " |
| 14 | " | 2-Chloro-5-methyl-1,4-phenylenediamine | " |
| 15 | " | 2-Chloro-5-methoxy-1,4-phenylenediamine | " |
| 16 | " | 2,5-Dimethyl-1,4-phenylenediamine | " |
| 17 | " | 2,3,5-Trichloro-1,4-phenylenediamine | " |
| 18 | " | 1,3-Phenylenediamine | " |
| 19 | " | 4-Chloro-1,3-phenylenediamine | " |
| 20 | " | 2-Methyl-1,3-phenylenediamine | " |
| 21 | " | 4-Methyl-1,3-phenylenediamine | " |
| 22 | " | 4-Methoxy-1,3-phenylenediamine | " |
| 23 | " | 2,4-Dichloro-1,3-phenylenediamine | " |
| 24 | " | 4,6-Dimethyl-1,3-phenylenediamine | " |
| 25 | 2-Amino-4,2'-dichloro-diphenyl-ether | 1,4-Phenylenediamine | " |
| 26 | " | 2-Chloro-1,4-phenylenediamine | " |
| 27 | " | 2-Bromo-1,4-phenylenediamine | " |
| 28 | " | 2-Trifluoromethyl-1,4-phenylenediamine | " |
| 29 | " | 2-Cyano-1,4-phenylenediamine | " |
| 30 | " | 2-Methyl-1,4-phenylenediamine | " |
| 31 | " | 2-Methoxy-1,4-phenylenediamine | Reddish-tinged yellow |
| 32 | " | 2-Ethoxy-1,4-phenylenediamine | Yellow |
| 33 | " | 2-Nitro-1,4-phenylenediamine | " |
| 34 | " | 2-Carboxylic acid methyl ester-1,4-phenylenediamine | " |
| 35 | " | 2,3-Dichloro-1,4-phenylenediamine | Greenish-tinged yellow |
| 36 | " | 2,5-Dichloro-1,4-phenylenediamine | " |
| 37 | " | 2,6-Dichloro-1,4-phenylenediamine | " |
| 38 | " | 2-Chloro-5-methyl-1,4-phenylenediamine | Yellow |
| 39 | " | 2-Chloro-5-methoxy-1,4-phenylenediamine | " |
| 40 | " | 2-Chloro-5-ethoxy-1,4-phenylenediamine | " |
| 41 | " | 2,5-Dimethyl-1,4-phenylenediamine | " |
| 42 | " | 1,3-Phenylenediamine | Greenish-tinged yellow |
| 43 | " | 4-Chloro-1,3-phenylenediamine | " |
| 44 | " | 4-Bromo-1,3-phenylenediamine | Yellow |
| 45 | " | 2-Methyl-1,3-phenylenediamine | " |
| 46 | " | 4-Methyl-1,3-phenylenediamine | " |
| 47 | " | 4-Methoxy-1,3-phenylenediamine | " |
| 48 | " | 2,4-Dichloro-1,3-phenylenediamine | " |
| 49 | " | 2,5-Dichloro-1,3-phenylenediamine | " |
| 50 | " | 4,6-Dichloro-1,3-phenylenediamine | " |
| 51 | " | 4,6-Dimethyl-1,3-phenylenediamine | " |
| 52 | " | 2,6-Dimethyl-1,3-phenylenediamine | " |
| 53 | 2-Amino-4,4'-dichloro-diphenyl-ether | 1,4-Phenylenediamine | Greenish-tinged yellow |
| 54 | " | 2-Chloro-1,4-phenylenediamine | Yellow |
| 55 | " | 2-Cyano-1,4-phenylenediamine | " |
| 56 | " | 2-Methyl-1,4-phenylenediamine | " |
| 57 | " | 2-Methoxy-1,4-phenylenediamine | " |
| 58 | " | 2-Nitro-1,4-phenylenediamine | " |
| 59 | " | 2-Carboxylic acid amide-1,4-phenylenediamine | Reddish-tinged yellow |
| 60 | " | 2,5-Dichloro-1,4-phenylenediamine | Yellow |
| 61 | " | 2,6-Dichloro-1,4-phenylenediamine | " |
| 62 | " | 2-Chloro-5-methoxy-1,4-phenylenediamine | " |
| 63 | " | 2-Chloro-5-ethoxy-1,4-phenylenediamine | " |
| 64 | " | 2,5-Dimethyl-1,4-phenylenediamine | " |
| 65 | " | 2,5-Diethoxycarbonyl-1,4-phenylenediamine | " |
| 66 | " | 2,3-Dichloro-1,4-phenylenediamine | " |
| 67 | " | 1,3-Phenylenediamine | Greenish-tinged yellow |
| 68 | " | 4-Chloro-1,3-phenylenediamine | " |
| 69 | " | 4-Bromo-1,3-phenylenediamine | Yellow |
| 70 | " | 2-Methyl-1,3-phenylenediamine | " |
| 71 | " | 4-Methyl-1,3-phenylenediamine | " |
| 72 | " | 4-Methoxy-1,3-phenylenediamine | " |
| 73 | " | 2,4-Dichloro-1,3-phenylenediamine | " |
| 74 | " | 2,5-Dichloro-1,3-phenylenediamine | " |
| 75 | " | 4,6-Dichloro-1,3-phenylenediamine | " |
| 76 | " | 4,6-Dimethyl-1,3-phenylenediamine | " |
| 77 | " | 2,6-Dimethyl-1,3-phenylenediamine | " |
| 78 | 2-Amino-4-chloro-4'-ethoxycarbonyl-diphenyl-ether | 1,4-Phenylenediamine | Greenish-tinged yellow |
| 79 | " | 2-Chloro-1,4-phenylenediamine | Yellow |
| 80 | " | 2-Bromo-1,4-phenylenediamine | " |
| 81 | " | 2-Cyano-1,4-phenylenediamine | " |
| 82 | " | 2-Methyl-1,4-phenylenediamine | Yellow-orange |
| 83 | " | 2-Methoxy-1,4-phenylenediamine | " |
| 84 | " | 2-Phenoxy-1,4-Phenylenediamine | " |
| 85 | " | 2-Nitro-1,4-phenylenediamine | " |
| 86 | " | 2,3-Dichloro-1,4-phenylenediamine | Yellow |
| 87 | " | 2,5-Dichloro-1,4-phenylenediamine | " |
| 88 | " | 2,6-Dichloro-1,4-phenylenediamine | " |
| 89 | " | 2,6-Bis-trifluoromethyl-1,4-phenylenediamine | " |
| 90 | " | 2,6-Dibromo-1,4-phenylenediamine | " |
| 91 | " | 2-Chloro-5-methyl-1,4-phenylenediamine | " |
| 92 | " | 2-Chloro-5-methoxy-1,4-phenylenediamine | " |
| 93 | " | 2-Chloro-5-ethoxy-1,4-phenylenediamine | " |
| 94 | " | 2,5-Dimethyl-1,4-phenylenediamine | " |
| 95 | " | 2-Methyl-5-methoxy-1,4-phenylenediamine | " |
| 96 | " | 2-Methyl-5-ethoxy-1,4-phenylenediamine | " |

Table—Continued

| Example No. | Diazo base | Bis-acetoacetyl compound of the diamine | 0.2% colouration in PVC |
|---|---|---|---|
| 97 | " | 2-Methyl-5-propoxy-1,4-phenylenediamine | " |
| 98 | " | 2-Methyl-5-iso-propoxy-1,4-phenylenediamine | " |
| 99 | " | 2-Methyl-5-butoxy-1,4-phenylenediamine | " |
| 100 | " | 1,3-Phenylenediamine | Greenish-tinged yellow |
| 101 | " | 4-Chloro-1,3-phenylenediamine | " |
| 102 | " | 4-Bromo-1,3-phenylenediamine | " |
| 103 | " | 2-Methyl-1,3-phenylenediamine | " |
| 104 | " | 4-Methoxy-1,3-phenylenediamine | " |
| 105 | " | 2,4-Dichloro-1,3-phenylenediamine | " |
| 106 | " | 2,5-Dichloro-1,3-phenylenediamine | " |
| 107 | " | 4,6-Dimethyl-1,3-phenylenediamine | " |
| 108 | 2-Amino-4-tri-fluoromethyl-4'-chloro-diphenyl-ether | 1,4-Phenylenediamine | " |
| 109 | " | 2-Chloro-1,4-phenylenediamine | Yellow |
| 110 | " | 2-Bromo-1,4-phenylenediamine | " |
| 111 | " | 2-Trifluoromethyl-1,4-phenylenediamine | " |
| 112 | " | 2-Cyano-1,4-phenylenediamine | " |
| 113 | " | 2-Methyl-1,4-phenylenediamine | Greenish-tinged yellow |
| 114 | " | 2-Methoxy-1,4-phenylenediamine | " |
| 115 | " | 2-Ethoxy-1,4-phenylenediamine | " |
| 116 | " | 2-Nitro-1,4-phenylenediamine | " |
| 117 | " | 2-Aminocarbonyl-1,4-phenylenediamine | " |
| 118 | " | 2,3-Dichloro-1,4-phenylenediamine | Yellow |
| 119 | " | 2,5-Dichloro-1,4-phenylenediamine | " |
| 120 | " | 2,6-Dichloro-1,4-phenylenediamine | " |
| 121 | " | 2-Chloro-5-methyl-1,4-phenylenediamine | " |
| 122 | " | 2-Chloro-5-methoxy-1,4-phenylenediamine | " |
| 123 | " | 2-Chloro-5-ethoxy-1,4-phenylenediamine | " |
| 124 | " | 2,5-Dimethyl-1,4-phenylenediamine | " |
| 125 | " | 2-Methyl-5-methoxy-1,4-phenylenediamine | " |
| 126 | " | 2-Methyl-5-ethoxy-1,4-phenylenediamine | " |
| 127 | " | 1,3-Phenylenediamine | Greenish-tinged yellow |
| 128 | " | 4-Chloro-1,3-phenylenediamine | Yellow |
| 129 | " | 4-Methyl-1,3-phenylenediamine | " |
| 130 | " | 4-Methoxy-1,3-phenylenediamine | " |
| 131 | " | 2,4-Dichloro-1,3-phenylenediamine | " |
| 132 | " | 2,5-Dichloro-1,3-phenylenediamine | " |
| 133 | 2-Amino-4-tri-fluoromethyl-2',4',5'-trichloro-diphenyl-ether | 1,4-Phenylenediamine | Greenish-tinged yellow |
| 134 | " | 2-Chloro-1,4-phenylenediamine | Yellow |
| 135 | " | 2-Bromo-1,4-phenylenediamine | " |
| 136 | " | 2-Trifluoromethyl-1,4-phenylenediamine | " |
| 137 | " | 2-Cyano-1,4-phenylenediamine | " |
| 138 | " | 2-Methyl-1,4-phenylenediamine | " |
| 139 | " | 2-Methoxy-1,4-phenylenediamine | Orange-yellow |
| 140 | " | 2-Ethoxy-1,4-phenylenediamine | " |
| 141 | " | 2-Propoxy-1,4-phenylenediamine | " |
| 142 | " | 2-Phenoxy-1,4-phenylenediamine | " |
| 143 | " | 2-Nitro-1,4-phenylenediamine | " |
| 144 | " | 2-Methoxycarbonyl-1,4-phenylenediamine | " |
| 145 | " | 2,5-Dichloro-1,4-phenylenediamine | Greenish-tinged yellow |
| 146 | " | 2,6-Dichloro-1,4-phenylenediamine | " |
| 147 | " | 2-Chloro-5-methyl-1,4-phenylenediamine | " |
| 148 | " | 2-Chloro-5-methoxy-1,4-phenylenediamine | " |
| 149 | " | 2-Chloro-5-ethoxy-1,4-phenylenediamine | " |
| 150 | " | 2,5-Dimethyl-1,4-phenylenediamine | " |
| 151 | " | 1,3-Phenylenediamine | Yellow |
| 152 | " | 4-Chloro-1,3-phenylenediamine | " |
| 153 | " | 4-Bromo-1,3-phenylenediamine | " |
| 154 | " | 2-Methyl-1,3-phenylenediamine | " |
| 155 | " | 4-Methyl-1,3-phenylenediamine | " |
| 156 | " | 4-Methoxy-1,3-phenylenediamine | " |
| 157 | " | 2,4-Dichloro-1,3-phenylenediamine | " |
| 158 | " | 2,5-Dichloro-1,3-phenylenediamine | " |
| 159 | 2,4-Di-(p-methylphenoxy)-5-chloroaniline | 1,4-Phenylenediamine | " |
| 160 | " | 2-Chloro-1,4-phenylenediamine | " |
| 161 | " | 2-Bromo-1,4-phenylenediamine | " |
| 162 | " | 2-Trifluoromethyl-1,4-phenylenediamine | " |
| 163 | " | 2-Cyano-1,4-phenylenediamine | " |
| 164 | " | 2-Methyl-1,4-phenylenediamine | " |
| 165 | " | 2-Methoxy-1,4-phenylenediamine | " |
| 166 | " | 2-Phenoxy-1,4-phenylenediamine | Orange-yellow |
| 167 | " | 2-Nitro-1,4-phenylenediamine | " |
| 168 | " | 2-Methoxycarbonyl-1,4-phenylenediamine | " |
| 169 | " | 2,6-Dichloro-1,4-phenylenediamine | " |
| 170 | " | 2-Chloro-5-methyl-1,4-phenylenediamine | Reddish-tinged yellow |
| 171 | " | 2-Chloro-5-methoxy-1,4-phenylenediamine | " |
| 172 | " | 2-Chloro-5-ethoxy-1,4-phenylenediamine | " |
| 173 | " | 2,5-Dimethyl-1,4-phenylenediamine | " |
| 174 | " | 2,5-Dimethoxy-1,4-phenylenediamine | " |
| 175 | " | 2-Methoxy-5-ethoxy-1,4-phenylenediamine | " |
| 176 | " | 2-Methoxy-5-propoxy-1,4-phenylenediamine | " |
| 177 | " | 2,5-Diethoxy-1,4-phenylenediamine | " |
| 178 | " | 1,3-Phenylenediamine | Yellow |
| 179 | " | 4-Chloro-1,3-phenylenediamine | " |
| 180 | " | 4-Bromo-1,3-phenylenediamine | " |
| 181 | " | 2-Methyl-1,3-phenylenediamine | " |

Table—Continued

| Example No. | Diazo base | Bis-acetoacetyl compound of the diamine | 0.2% colouration in PVC |
|---|---|---|---|
| 182 | " | 4-Methyl-1,3-phenylenediamine | " |
| 183 | " | 2,6-Dimethyl-1,3-phenylenediamine | " |
| 184 | 2,4-Di-(p-chlorophenoxy)-5-trifluoromethylaniline | 1,4-Phenylenediamine | " |
| 185 | " | 2-Chloro-1,4-phenylenediamine | " |
| 186 | " | 2-Bromo-1,4-phenylenediamine | " |
| 187 | " | 2-Trifluoromethyl-1,4-phenylenediamine | " |
| 188 | " | 2-Cyano-1,4-phenylenediamine | " |
| 189 | " | 2-Methyl-1,4-phenylenediamine | " |
| 190 | " | 2-Methoxy-1,4-phenylenediamine | " |
| 191 | " | 2-Ethoxy-1,4-phenylenediamine | " |
| 192 | " | 2-Propoxy-1,4-phenylenediamine | " |
| 193 | " | 2-Iso-propoxy-1,4-phenylenediamine | " |
| 194 | " | 2-Nitro-1,4-phenylenediamine | Reddish-tinged yellow |
| 195 | " | 2-Aminocarbonyl-1,4-phenylenediamine | " |
| 196 | " | Ethoxycarbonyl-1,4-phenylenediamine | " |
| 197 | " | 2,5-Diethoxycarbonyl-1,4-phenylenediamine | " |
| 198 | " | 2,3-Dichloro-1,4-phenylenediamine | " |
| 199 | " | 2,5-Dichloro-1,4-phenylenediamine | " |
| 200 | " | 2,6-Dichloro-1,4-phenylenediamine | " |
| 201 | " | 2-Chloro-5-methyl-1,4-phenylenediamine | " |
| 202 | " | 2-Chloro-5-methoxy-1,4-phenylenediamine | " |
| 203 | " | 2-Chloro-5-ethoxy-1,4-phenylenediamine | " |
| 204 | " | 2,5-Dimethyl-1,4-phenylenediamine | " |
| 205 | " | 2,5-Dimethoxy-1,4-phenylenediamine | " |
| 206 | " | 2,5-Diethoxy-1,4-phenylenediamine | " |
| 207 | " | 2,5-Dipropoxy-1,4-phenylenediamine | " |
| 208 | " | 2-Methoxy-5-ethoxy-1,4-phenylenediamine | " |
| 209 | " | 1,3-Phenylenediamine | " |
| 210 | " | 4-Chloro-1,3-phenylenediamine | " |
| 211 | " | 4-Bromo-1,3-phenylenediamine | " |
| 212 | " | 2-Methyl-1,3-phenylenediamine | " |
| 213 | " | 4-Methyl-1,3-phenylenediamine | " |
| 214 | " | 4-Methoxy-1,3-phenylenediamine | " |
| 215 | " | 2,4-Dichloro-1,3-phenylenediamine | " |
| 216 | 2-Amino-4-trifluoromethyl-4'-methyl-diphenyl-ether | 1,4-Phenylenediamine | Yellow |
| 217 | " | 2-Chloro-1,4-phenylenediamine | " |
| 218 | " | 2-Cyano-1,4-phenylenediamine | " |
| 219 | " | 2-Methyl-1,4-phenylenediamine | " |
| 220 | " | 2-Methoxy-1,4-phenylenediamine | Reddish-tinged yellow |
| 221 | " | 2-Phenoxy-1,4-phenylenediamine | " |
| 222 | " | 2-Nitro-1,4-phenylenediamine | " |
| 223 | " | 2-Aminocarbonyl-1,4-phenylenediamine | " |
| 224 | " | 2-Methoxycarbonyl-1,4-phenylenediamine | " |
| 225 | " | 2,5-Dichloro-1,4-phenylenediamine | " |
| 226 | " | 2-Chloro-5-methyl-1,4-phenylenediamine | " |
| 227 | " | 2-Chloro-5-methoxy-1,4-phenylenediamine | " |
| 228 | " | 1,3-Phenylenediamine | " |
| 229 | " | 4-Chloro-1,3-phenylenediamine | " |
| 230 | " | 2-Methyl-1,3-phenylenediamine | " |
| 231 | 2-Amino-4-trifluoromethyl-3'-methyl-5'-chloro-diphenyl-ether | 1,4-Phenylenediamine | " |
| 232 | " | 2-Chloro-1,4-phenylenediamine | " |
| 233 | " | 2-Trifluoromethyl-1,4-phenylenediamine | " |
| 234 | " | 2-Cyano-1,4-phenylenediamine | " |
| 235 | " | 2-Methyl-1,4-phenylenediamine | " |
| 236 | " | 2,3-Dichloro-1,4-phenylenediamine | " |
| 237 | " | 2,5-Dichloro-1,4-phenylenediamine | " |
| 238 | 2-Ethoxy-4,5-dichloro-aniline | 2-Chloro-5-methyl-1,4-phenylenediamine | " |
| 239 | " | 2-Chloro-5-methoxy-1,4-phenylenediamine | " |
| 240 | " | 2-Chloro-ethoxy-1,4-phenylenediamine | " |
| 241 | " | 2,5-Dimethyl-1,4-phenylenediamine | " |
| 242 | " | 1,3-Phenylenediamine | " |
| 243 | " | 4-Chloro-1,3-phenylenediamine | " |
| 244 | " | 2-Methyl-1,3-phenylenediamine | " |
| 245 | " | 4-Methyl-1,3-phenylenediamine | " |
| 246 | 2,4-Di-(β-naphthoxy)-5-chloroaniline | 1,4-Phenylenediamine | Yellow |
| 247 | " | 2-Chloro-1,4-phenylenediamine | " |
| 248 | " | 2-Methyl-1,4-phenylenediamine | " |
| 249 | " | 2-Methoxy-1,4-phenylenediamine | " |
| 250 | " | 2-Nitro-1,4-phenylenediamine | " |
| 251 | " | 2,6-Dichloro-1,4-phenylenediamine | " |
| 252 | " | 2-Chloro-5-methyl-1,4-phenylenediamine | " |
| 253 | " | 2-Chloro-5-methoxy-1,4-phenylenediamine | " |
| 254 | " | 2,5-Dimethyl-1,4-phenylenediamine | " |
| 255 | " | 2-Methyl-5-methoxy-1,4-phenylenediamine | " |
| 256 | " | 1,3-Phenylenediamine | " |
| 257 | " | 4-Chloro-1,3-phenylenediamine | " |
| 258 | " | 4-Methoxy-1,3-phenylenediamine | " |
| 259 | " | 2,5-Dimethoxy-1,4-phenylenediamine | " |
| 260 | " | 2,5-Diethoxy-1,4-phenylenediamine | " |
| 261 | " | 2,5-Dipropoxy-1,4-phenylenediamine | " |
| 262 | " | Di-iso-propoxy-1,4-phenylenediamine | " |

Table — Continued

| Example No. | Diazo base | Bis-acetoacetyl compound of the diamine | 0.2% colouration in PVC |
|---|---|---|---|
| 263 | " | 2-Methoxy-5-ethoxy-1,4-phenylenediamine | " |
| 264 | " | 2-Methoxy-5-propoxy-1,4-phenylenediamine | " |
| 265 | 2-Ethoxyethoxy-5-trifluoro-methyl-aniline | 1,4-Phenylenediamine | Greenish-tinged yellow |
| 266 | " | 2,5-Dichloro-phenylenediamine | " |
| 267 | " | 1,4-Phenylenediamine | " |
| 268 | " | 2,5-Dichloro-phenylenediamine | " |
| 269 | 2-Amino-4-trifluoro-methyl-2'-methyl-diphenyl-ether | 1,4-Phenylenediamine | Yellow |
| 270 | " | 2-Chloro-1,4-phenylenediamine | " |
| 271 | " | 2-Methyl-1,4-phenylenediamine | " |
| 272 | " | 2-Methoxy-1,4-phenylenediamine | " |
| 273 | " | 2-Nitro-1,4-phenylenediamine | Greenish-tinged yellow |
| 274 | " | 2,6-Dichloro-1,4-phenylenediamine | " |
| 275 | " | 2-Chloro-5-methyl-1,4-phenylenediamine | " |
| 276 | " | 2-Chloro-5-methoxy-1,4-phenylenediamine | Yellow |
| 277 | " | 2,5-Dimethyl-1,4-phenylenediamine | " |
| 278 | " | 2-Methyl-5-methoxy-1,4-phenylenediamine | " |
| 279 | " | 1,3-Phenylenediamine | " |
| 280 | " | 4-Chloro-1,3-phenylenediamine | " |
| 281 | " | 4-Methyl-1,3-phenylenediamine | " |
| 282 | 2-Amino-4-trifluoro-methyl-2',4'-dichloro-diphenyl-ether | 1,4-Phenylenediamine | |
| 283 | " | 2-Chloro-1,4-phenylenediamine | " |
| 284 | " | 2-Methyl-1,4-phenylenediamine | Greenish-tinged yellow |
| 285 | " | 2-Methoxy-1,4-phenylenediamine | " |
| 286 | " | 2-Nitro-1,4-phenylenediamine | " |
| 287 | " | 2,6-Dichloro-1,4-phenylenediamine | " |
| 288 | " | 2-Chloro-5-methyl-1,4-phenylenediamine | " |
| 289 | " | 2-Chloro-5-methoxy-1,4-phenylenediamine | " |
| 290 | " | 2,5-Dimethyl-1,4-phenylenediamine | " |
| 291 | " | 2-Methyl-5-methoxy-1,4-phenylenediamine | " |
| 292 | " | 1,3-Phenylenediamine | Yellow |
| 293 | " | 4-Chloro-1,3-phenylenediamine | " |
| 294 | " | 4-Methyl-1,3-phenylenediamine | " |
| 295 | 2-Amino-4-trifluoro-methyl-2'-chloro-diphenyl-ether | 1,4-Phenylenediamine | |
| 296 | " | 2-Chloro-1,4-phenylenediamine | " |
| 297 | " | 2-Methyl-1,4-phenylenediamine | " |
| 298 | " | 2-Methoxy-1,4-phenylenediamine | " |
| 299 | " | 2-Nitro-1,4-phenylenediamine | " |
| 300 | " | 2,6-Dichloro-1,4-phenylenediamine | " |
| 301 | " | 2-Chloro-5-methyl-1,4-phenylenediamine | " |
| 302 | " | 2-Chloro-5-methoxy-1,4-phenylenediamine | " |
| 303 | " | 2,5-Dimethyl-1,4-phenylenediamine | " |
| 304 | " | 2-Methyl-5-methoxy-1,4-phenylenediamine | " |
| 305 | " | 1,3-Phenylenediamine | " |
| 306 | " | 4-Chloro-1,3-phenylenediamine | " |
| 307 | " | 4-Methyl-1,3-phenylenediamine | " |
| 308 | 2,4-Diphenoxy-5-chloro-aniline | 1,4-Phenylenediamine | " |
| 309 | " | 2-Chloro-1,4-phenylenediamine | " |
| 310 | " | 2-Methyl-1,4-phenylenediamine | " |
| 311 | " | 2-Methoxy-1,4-phenylenediamine | " |
| 312 | " | 2-Phenoxy-1,4-phenylenediamine | " |
| 313 | " | 2-Nitro-1,4-phenylenediamine | Orange-yellow |
| 314 | " | 2,6-Dichloro-1,4-phenylenediamine | " |
| 315 | " | 2-Chloro-5-methyl-1,4-phenylenediamine | " |
| 316 | " | 2-Chloro-5-methoxy-1,4-phenylenediamine | " |
| 317 | " | 2,5-Dimethyl-1,4-phenylenediamine | " |
| 318 | " | 2-Methyl-5-methoxy-1,4-phenylenediamine | " |
| 319 | " | 2,5-Dimethoxy-1,4-phenylenediamine | " |
| 320 | " | 1,3-Phenylenediamine | Yellow |
| 321 | " | 4-Chloro-1,3-phenylenediamine | " |
| 322 | 2,4-Di-(p-chlorophenoxy)-5-chloro-aniline | 1,4-Phenylenediamine | " |
| 323 | " | 2-Chloro-1,4-phenylenediamine | " |
| 324 | " | 2-Methyl-1,4-phenylenediamine | " |
| 325 | " | 2-Methoxy-1,4-phenylenediamine | " |
| 326 | " | 2-Phenoxy-1,4-phenylenediamine | " |
| 327 | " | 2-Nitro-1,4-phenylenediamine | " |
| 328 | " | 2,6-Dichloro-1,4-phenylenediamine | " |
| 329 | " | 2-Chloro-5-methyl-1,4-phenylenediamine | " |
| 330 | " | 2-Chloro-5-methoxy-1,4-phenylenediamine | " |
| 331 | " | 2,5-Dimethyl-1,4-phenylenediamine | " |
| 332 | " | 2-Methyl-5-methoxy-1,4-phenylenediamine | " |
| 333 | " | 2,5-Dimethoxy-1,4-phenylenediamine | " |
| 334 | " | 1,3-Phenylenediamine | " |
| 335 | " | 4-Chloro-1,3-phenylenediamine | " |
| 336 | 2,4-Di-(2'',4''-dichloro-phenoxy)-5-chloro-aniline | 1,4-Phenylenediamine | " |
| 337 | " | 2-Chloro-1,4-phenylenediamine | " |
| 338 | " | 2-Methyl-1,4-phenylenediamine | " |
| 339 | " | 2-Methoxy-1,4-phenylenediamine | |

Table—Continued

| Example No. | Diazo base | Bis-acetoacetyl compound of the diamine | 0.2% colouration in PVC |
|---|---|---|---|
| 340 | " | 2-Phenoxy-1,4-phenylenediamine | " |
| 341 | " | 2-Nitro-1,4-phenylenediamine | Orange-yellow |
| 342 | " | 2,6-Dichloro-1,4-phenylenediamine | " |
| 343 | " | 2-Chloro-5-methyl-1,4-phenylenediamine | " |
| 344 | " | 2-Chloro-5-methoxy-1,4-phenylenediamine | " |
| 345 | " | 2,5-Dimethyl-1,4-phenylenediamine | " |
| 346 | " | 2-Methyl-5-methoxy-1,4-phenylenediamine | " |
| 347 | " | 2,5-Dimethoxy-1,4-phenylenediamine | " |
| 348 | " | 1,3-Phenylenediamine | Yellow |
| 349 | " | 4-Chloro-1,3-phenylenediamine | " |
| 350 | 2,4-Di-(3',5'-dimethylphenoxy)-5-chloro-aniline | 1,4-Phenylenediamine | " |
| 351 | " | 2-Chloro-1,4-phenylenediamine | " |
| 352 | " | 2-Methyl-1,4-phenylenediamine | " |
| 353 | " | 2-Methoxy-1,4-phenylenediamine | " |
| 354 | " | 2-Phenoxy-1,4-phenylenediamine | " |
| 355 | " | 2-Nitro-1,4-phenylenediamine | " |
| 356 | " | 2,6-Dichloro-1,4-phenylenediamine | " |
| 357 | " | 2-Chloro-5-methyl-1,4-phenylenediamine | " |
| 358 | " | 2-Chloro-5-methoxy-1,4-phenylenediamine | " |
| 359 | " | 2,5-Dimethyl-1,4-phenylenediamine | " |
| 360 | " | 2-Methyl-5-methoxy-1,4-phenylenediamine | " |
| 361 | " | 2,5-Dimethoxy-1,4-phenylenediamine | " |
| 362 | " | 1,3-Phenylenediamine | " |
| 363 | " | 4-Chloro-1,3-phenylenediamine | " |

EXAMPLE 364

65 parts of stabilised polyvinyl chloride, 35 parts of dioctyl phthalate and 0.2 part of the dyestuff obtained according to Example 1 are stirred together and are then milled on a two-roll calender for 7 minutes at 140°C. A yellow-coloured film of good fastness to light and to migration is obtained.

We claim:

1. A disazo pigment of the formula

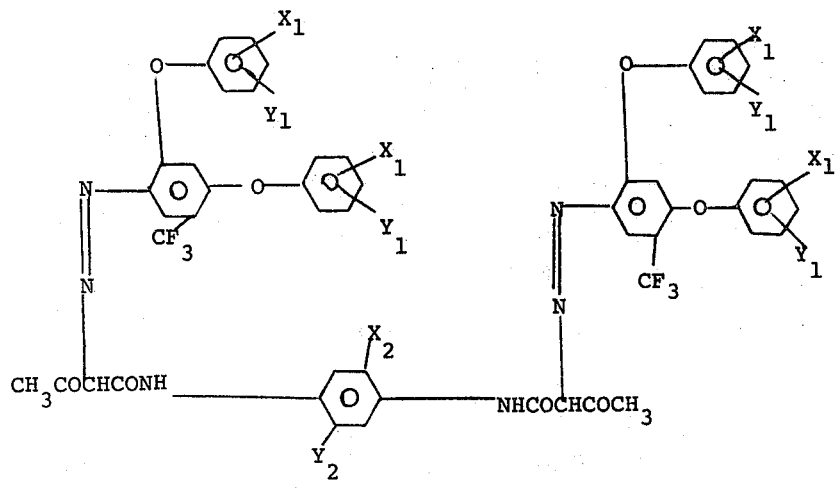

or

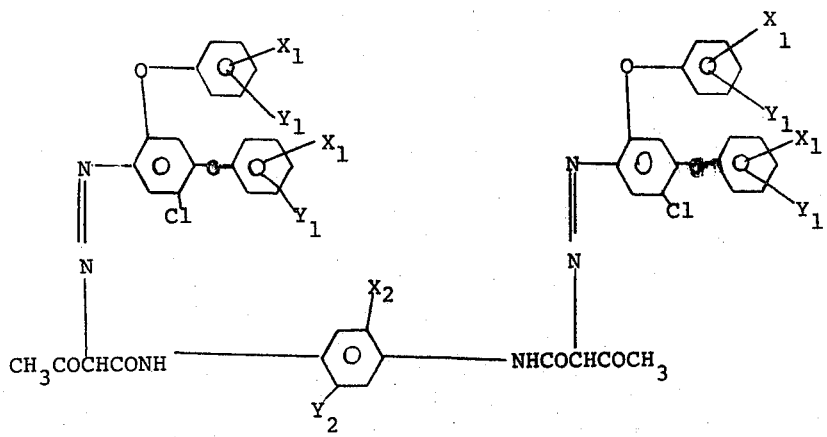

wherein $X_1$, $Y_1$ and $X_2$ is hydrogen, chloro, bromo, alkyl of 1 to 5 carbon atoms, alkoxy of 1 to 5 carbon atoms, or carbalkoxy of 1 to 5 carbon atoms, and $Y_2$ is hydrogen, chloro, bromo, alkyl of 1 to 4 carbon atoms, or alkoxy of 1 to 4 carbon atoms.

2. A disazo pigment of the formula wherein $X_1$, $Y_1$, and $X_2$ is hydrogen, chloro, bromo, alkyl of 1 to 5 carbon atoms, alkoxy of 1 to 5 carbon atoms or carbalkoxy of 1 to 5 carbon atoms. $Y_2$ is hydrogen, bromo, chloro, or alkyl of 1 to 4 carbon atoms.

3. The disazo pigment according to claim 1 of the formula

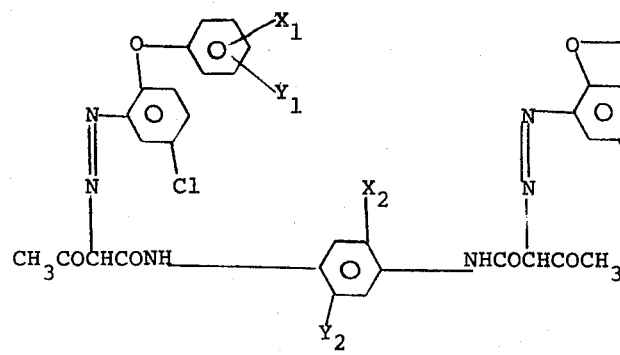

or

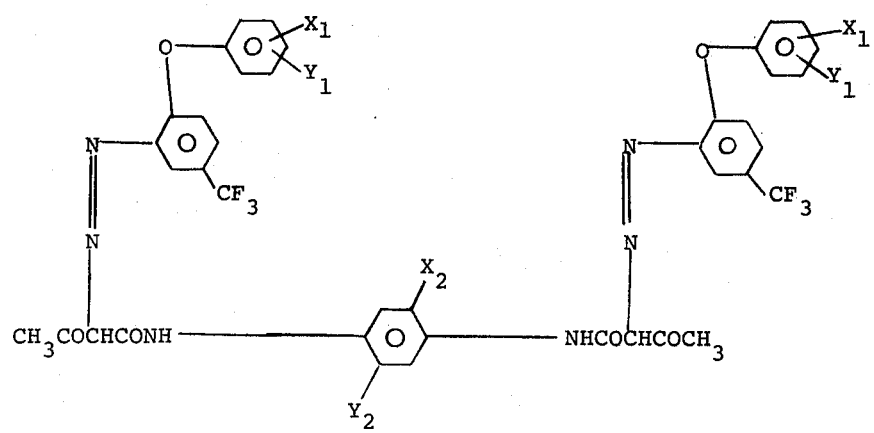

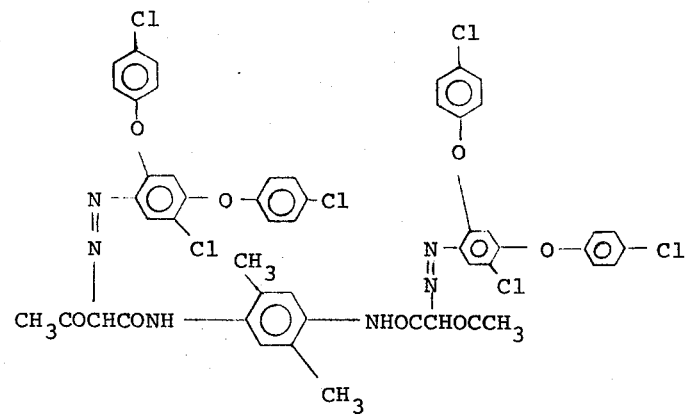

4. The disazo pigment according to claim 1 of the formula
7. The disazo pigment of claim 2 of the formula
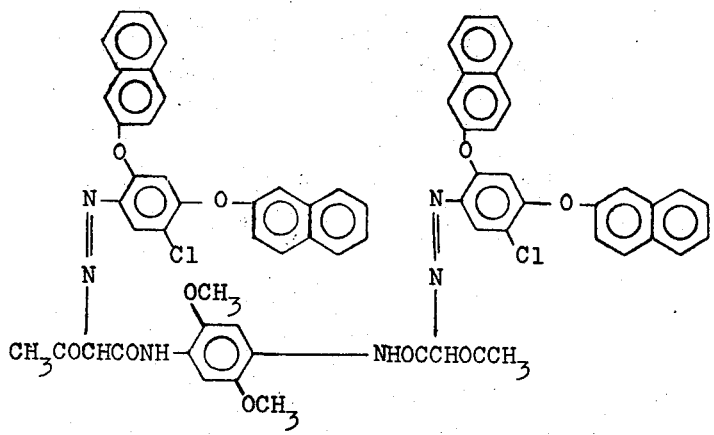
5. The disazo pigment according to claim 2 of the formula
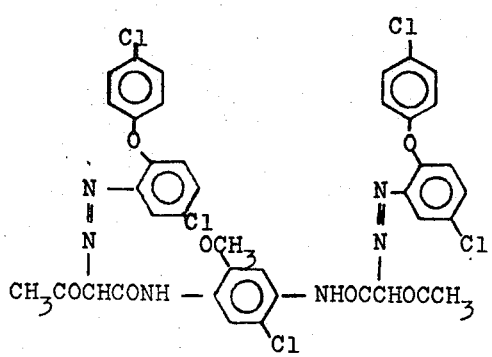
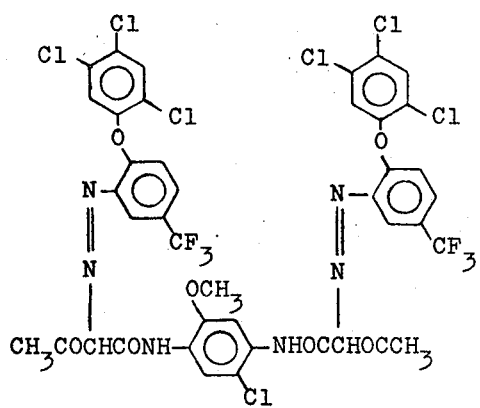
6. The disazo pigment according to claim 2 of the formula
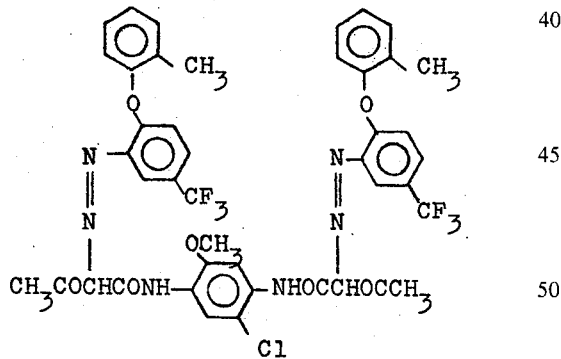
* * * * *